A. A. GAYLORD.
Lightning Rod Joint.

No. 113869. Patented Apr. 18 1871.

Inventor,
A. A. Gaylord

Witnesses.
J. H. Burridge
D. L. Humphrey

United States Patent Office.

ALBERT A. GAYLORD, OF EAST CLEVELAND, OHIO.

Letters Patent No. 113,869, dated April 18, 1871.

---

IMPROVEMENT IN LIGHTNING-RODS.

---

The Schedule referred to in these Letters Patent and making part of the same.

---

*To all whom it may concern:*

Be it known that I, ALBERT A. GAYLORD, of East Cleveland, in the county of Cuyahoga and State of Ohio, have invented a certain new and improved Lightning-Rod Connection; and I do hereby declare that the following is a full, clear, and complete description of the same, reference being had to the accompanying drawing making part of this specification, in which—

Figure 1:
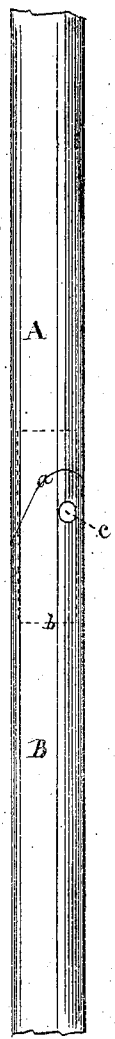
Figure 2:
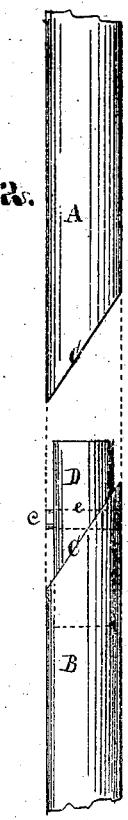
Figure 3:
Figure 4:
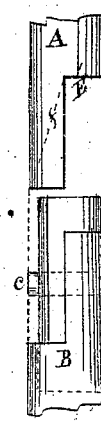

Figure 1 is a view of the rod connected.
Figure 2 is a view of the rod disconnected.
Figures 3 and 4 are modifications of fig. 1.

Like letters of reference refer to like parts in the several views.

The nature of this invention relates to a joint for connecting tubular lightning-rods; and The object thereof is to produce a cheap, simple, and secure joint, whereby the continuity of the rod shall be maintained.

I am aware that there are several devices adopted for connecting sections of this class of rods, but my device differs materially from others, and possesses important advantages not obtained by any other mode of connection, and which is as follows:

In the drawing, fig. 1—

A B represent two sections of tubular rod, and which are connected to each other by means of a lap or scarf-joint.

Said joint is made by cutting the end of each section at an angle of greater or lesser degree, as shown at C, fig. 2, so that the two ends, when brought together, will lap one upon the other, as shown in fig. 1, in which *a* represents the seam of the joint.

D, fig. 2, is the dowel, which may be either solid or tubular. Said dowel is inserted in the end of the two sections of rod, which is sufficiently long to extend beyond the length of the lap, as indicated by the dotted lines *b*, fig. 1.

The ends of the two sections on being brought together, as shown in fig. 1, are thus secured by a pin, *c*, inserted transversely through the end of each lap and through the dowel, as shown by the dotted line *e*, fig. 2.

The hole for the admission of the pin is draw-bored; hence the two miter-like ends are drawn closely upon each other, forming a close, strong, and easily-made joint.

A joint thus made possesses several special advantages over others in use.

In making the two ends lap upon each other, as described, but little skill and care are required to bore the holes for the admission of the pin, as the lap prevents the two sections from turning round upon the dowel while the whole is being bored; hence the hole is bored true, so that the pin will fit closely and draw the ends together, making a tight and perfect joint.

It will be observed that only one pin is used or need be used in making this joint, and which, passing through each lap near the end, draws it closely down in contact with the tube, thereby enabling the joint to resist with additional strength any lateral strain exerted upon it, and which, in consequence of the lap, the joint has a large bearing surface, and will therefore have great resisting power to oppose the transverse strain; hence the joint is not liable to bend and open the seam, and thereby disable the conducting capacity of the rod.

Figs. 3 and 4 represent slight modifications of the above-described joint, in which the essential principle of the lap and the use of one pin is maintained.

By extending the length of the lap two pins may be used, which, however, are not essential, as one pin is sufficient for the purpose.

Claim.

What I claim as my invention, and desire to secure by Letters Patent, is—

Tubular lightning-rods, the sections thereof connected by means of a lap or scarf-joint secured by a dowel, D, and pin or pins *c*, substantially in the manner as and for the purpose set forth.

ALBERT A. GAYLORD.

Witnesses:
J. H. BURRIDGE,
D. L. HUMPHREY.